United States Patent Office 2,727,383
Patented Dec. 20, 1955

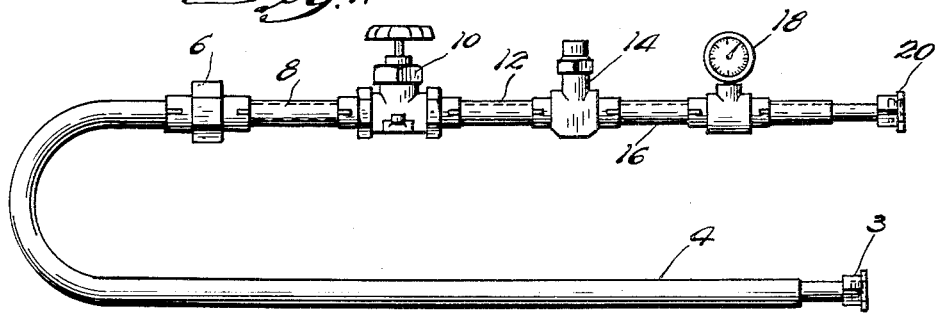
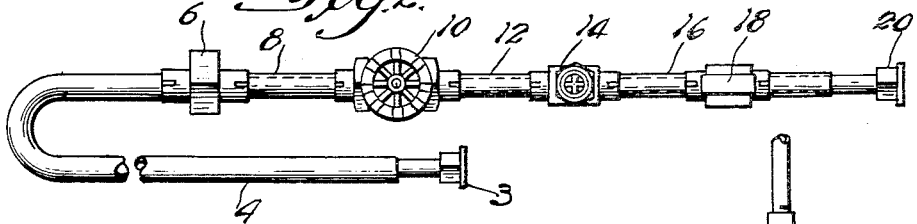
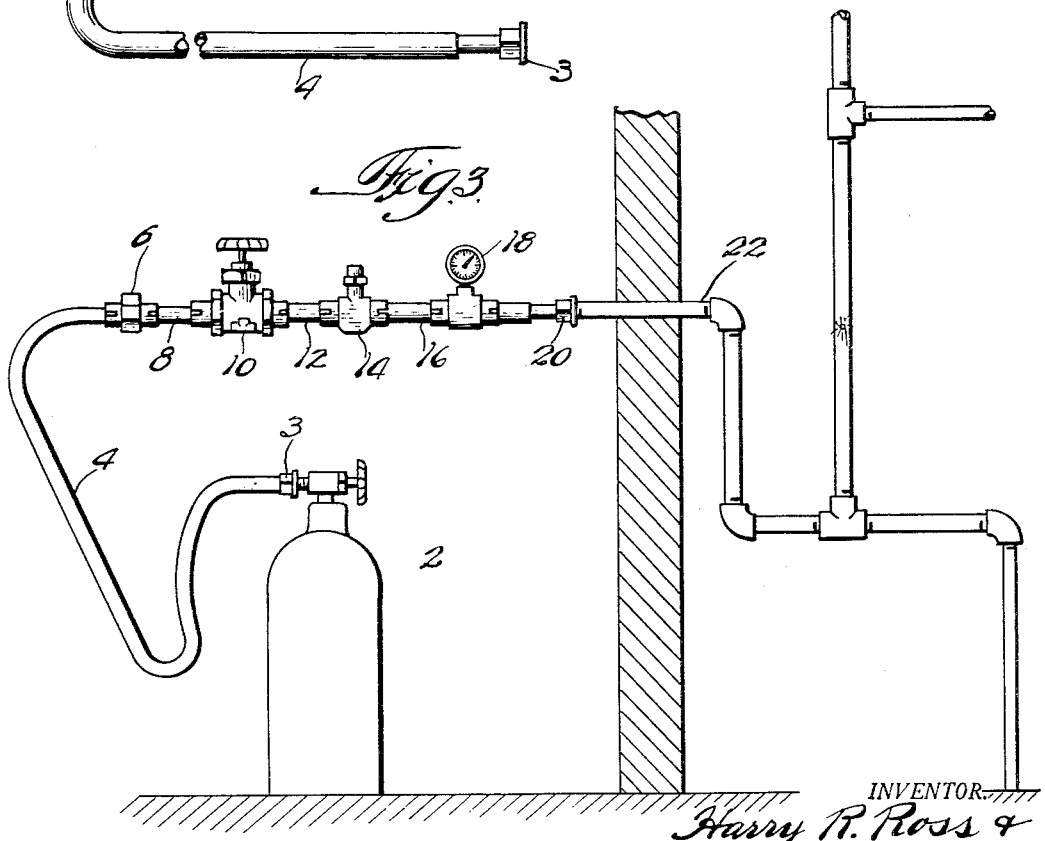

2,727,383

METHOD AND APPARATUS FOR TESTING AND CLEANING PIPE LINES

Harry R. Ross and Stanley Gantz, Chicago, Ill., assignors to General Air Products Corporation, Chicago, Ill., a corporation of Illinois Application April 21, 1953, Serial No. 350,184

3 Claims. (Cl. 73—40.7)

This invention relates to the pressurizing of pipes, as, for example, in the testing and cleaning of such pipes in a water or gas system.

According to prior art practice, a compressed gas such as air (sometimes mixed with an opaque gas such as ammonia chloride) is pumped into a pipe line to pressure the same, as for example, when cleaning the line or testing the line for leaks. This practice not only requires two operators, one to pump and the other to inspect for leaks, but also is inefficient due to the difficulty of finding leaks and due to the manual labor required in pumping to maintain adequate pressure in the line. Furthermore, this practice is entirely ineffective in locating leaks in such a line at a point beneath a floor or behind a wall.

A primary object of the invention is to devise a system wherein a single operator may pressurize a pipe line.

Another object of the invention is to afford external visual indicia of a leak in a pipe line.

Still another object of the invention is to afford indicia of a leak in a pipe line which is hidden, as for example, a radiant heating line beneath a floor or a water line behind a wall.

A more specific object of the invention is to charge a pipe line with a compressed gas, such as carbon dioxide, which freezes moisture in the atmosphere upon release to atmospheric pressure, thereby affording visual and tactile indicia of a leak in the line.

Another object of the invention is to afford higher pressures, as may be required in testing or in clearing lines of water or obstructions.

The foregoing and other advantages of the invention will become apparent from a consideration of the following specification and the accompanying drawings, wherein:

Figure 1 is a side elevational view of apparatus embodying the invention;

Figure 2 is a top plan view of the apparatus shown in Fig. 1; and

Figure 3 is a diagrammatic view of the apparatus connected to a pipe line.

Describing the invention in detail, the drawings illustrate a novel apparatus which may be used in the practice of the invention.

This apparatus, in the illustrated embodiment, comprises a tank or reservoir 2 of liquid carbon dioxide at a pressure of, for example, the order of 1000 pounds per square inch. The tank 2 is connected by a coupling 3 to a flexible line 4 having a coupling 6 affording a fluid connection to a section 8 of pipe threaded into an inlet of a stopcock 10.

The stopcock outlet is connected to another section 12 of pipe which is connected to the inlet of an adjustable pressure reducer valve 14. The valve admits carbon dioxide at an adjustable pressure value of, for example, 100 pounds per square inch to a section 16 of pipe having a pressure gauge 18 connected thereto. The pipe section 16 is provided with a conventional coupling 20 for attachment to a pipe line 22 (Figure 3) such as a gas line or water line of a dwelling or factory.

It will be understood that carbon dioxide in the tank 2 is preferably liquid, and upon flow into the pipe section 16 due to the reduction in pressure, the carbon dioxide assumes its normal gas phase and passes into the line 22, the outlets of which are closed for testing. Thus, pressure in the line 22 rapidly reaches the desired test pressure which has been assumed to be 100 pounds per square inch.

In the event that there is a leak in the line 22, the carbon dioxide escapes with a sound which is clearly audible if the leaking point is open to inspection. Immediately upon escape of the carbon dioxide to the atmosphere, it absorbs heat, thereby freezing atmospheric moisture around the leak. This not only provides visual indicia of the leak by forming a white frozen area therearound, but also enables an operator to slide his hand along the pipe to feel a frozen area which is not readily visible for some reason.

A further and extremely important aspect of the invention is the facility with which leaks may be discovered in hidden pipes, as for example, a radiant heating pipe line beneath a concrete floor. According to the invention, it has been discovered that when such a line is charged with carbon dioxide at superatmospheric pressure, a cold spot in the concrete forms in the region of the leak. This cold spot may be located, as by passing the hand over the concrete until the approximate location of the leak has been determined by ascertaining the area of the cold spot in the concrete. This novel system for detecting such leaks in hidden lines affords economical repair of such lines, without the necessity of destroying an entire partition, such as a floor or wall, behind which the leaking pipe is concealed.

The novel system is also useful in forcing water from pipe lines during periods of cold weather to prevent damage to the pipe lines due to freezing of such water, and also to blow obstructions, such as building materials, from pipe lines in new construction. It has also been found that the system is especially effective where higher than usual testing pressures are needed to ascertain leaks in lines.

Although carbon dioxide in practice has proven to be the best test fluid because it is always a gas at atmospheric pressure, it will be understood that other fluids may be used at superatmospheric pressure which, upon release to atmospheric pressure, will cause the leaking gas to absorb sufficient heat to freeze atmospheric moisture around the leak in the tested pipe line. A few of such fluids are tabulated below, together with their pertinent physical characteristics:

| Fluid | Symbol | Boiling Point Atmospheric Pressure, °F. | Minimum Pressure Required to Liquify at 80° F. | Melting Point, °F. |
|---|---|---|---|---|
| | | | lbs. gage | |
| Carbon dioxide | $CO_2$ | (¹) | 960 | −161 |
| Ammonia | $NH_3$ | −28 | 140 | −107 |
| Sulfur dioxide | $SO_2$ | 14 | 45 | −102 |
| Methyl chloride | $CH_3Cl$ | −10.6 | 73 | −132.5 |
| Butane | $C_4H_{10}$ | 32 | 25 | −211 |
| Propane | $C_3H_8$ | −43 | 130 | −310 |
| Ethane | $C_2H_6$ | −127 | 615 | −277 |
| Isobutane | $C_4H_{10}$ | 13.6 | 40 | −229 |
| Nitrous oxide | $N_2O$ | −128 | 880 | −152 |
| Dichlorodifluoromethane | $CF_2Cl_2$ | 21 | 85 | −247 |
| Ethyl chloride | $CHCl$ | 54 | 10 | −244.5 |

¹ Not liquid at atmospheric pressure.

While the present invention has been explained and described with reference to specific contemplations of structures and examples of feature detail, it will be understood nevertheless that numerous changes and modifications are capable of being incorporated within the comprehensive scope thereof. Accordingly, for a better understanding of the invention, it is not intended to be limited by the foregoing description or annexed drawings, except as indicated in the hereunto appended claims.

What is claimed as new and desired to be secured by Letters Patent of the United States is as follows:

1. A method of testing a closed pipe line for leaks comprising the steps of connecting a tank of liquid carbon dioxide to said pipe line through a valve which admits carbon dioxide to said pipe line at a superatmospheric pressure value at which carbon dioxide is in its gaseous phase, and then examining said pipe line to discover frozen atmospheric moisture around leaks in said pipe line.

2. A method of testing a closed pipe line behind an apaque partition, said method comprising charging said line with a gas at a superatmospheric pressure value capable of freezing atmospheric moisture upon release of said gas from said pressure to atmospheric pressure, and then testing said partition to locate a cold spot in said partition in the region of a leak in said line.

3. In apparatus for testing pipe line leaks, the combination of a tank of liquid carbon dioxide, a flexible line connected to said tank, a pressure reducing valve connected to said line and accommodating flow of carbon dioxide from said tank at a superatmospheric pressure at which carbon dioxide is a gas at room temperature, and a coupling connected to the outlet side of said valve for coupling the latter to said pipe line.

References Cited in the file of this patent

UNITED STATES PATENTS

| | | |
|---|---|---|
| 2,345,387 | Elsey | Mar. 28, 1944 |
| 2,612,037 | Van Rooy | Sept. 30, 1952 |

OTHER REFERENCES

Publication EM977, "Modern Electric and Gas Refrigeration," by Goodheart Wilcox Pub. Co. for U. S. Armed Forces, 1944, pp. 276–277.